April 12, 1932.  F. W. WARDWELL, JR  1,853,245
SAW FILING MACHINE
Filed Jan. 11, 1926     5 Sheets-Sheet 1

Inventor
F. W. WARDWELL JR.

By Fisher Messer Mason
Attorney

April 12, 1932.    F. W. WARDWELL, JR    1,853,245
SAW FILING MACHINE
Filed Jan. 11, 1926    5 Sheets-Sheet 2

Inventor

F. W. WARDWELL JR.

By Fisher, Moser & Moore

Attorneys

Inventor
F. W. Wardwell Jr.
By Fisher, Moser & Moore
Attorney

April 12, 1932.　　F. W. WARDWELL, JR　　1,853,245
SAW FILING MACHINE
Filed Jan. 11, 1926　　5 Sheets-Sheet 4
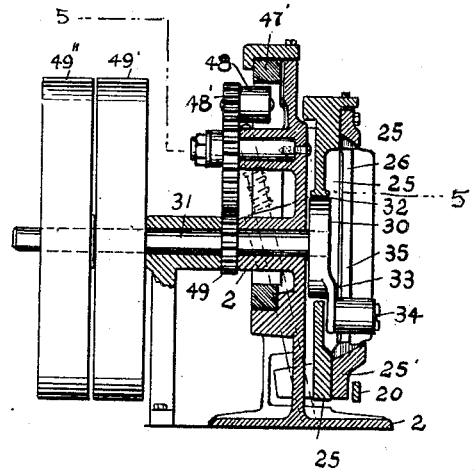
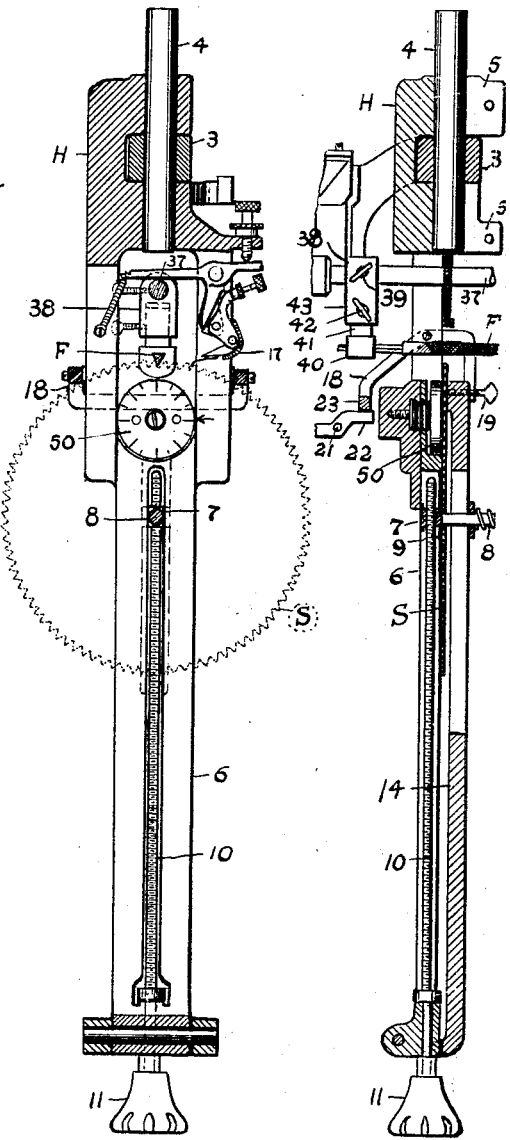
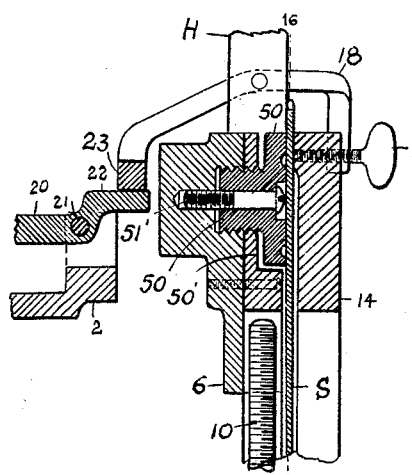
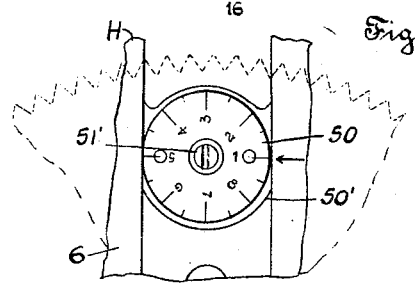
Inventor
F. W. WARDWELL JR.
By Fisher, Moser & Moore
Attorney

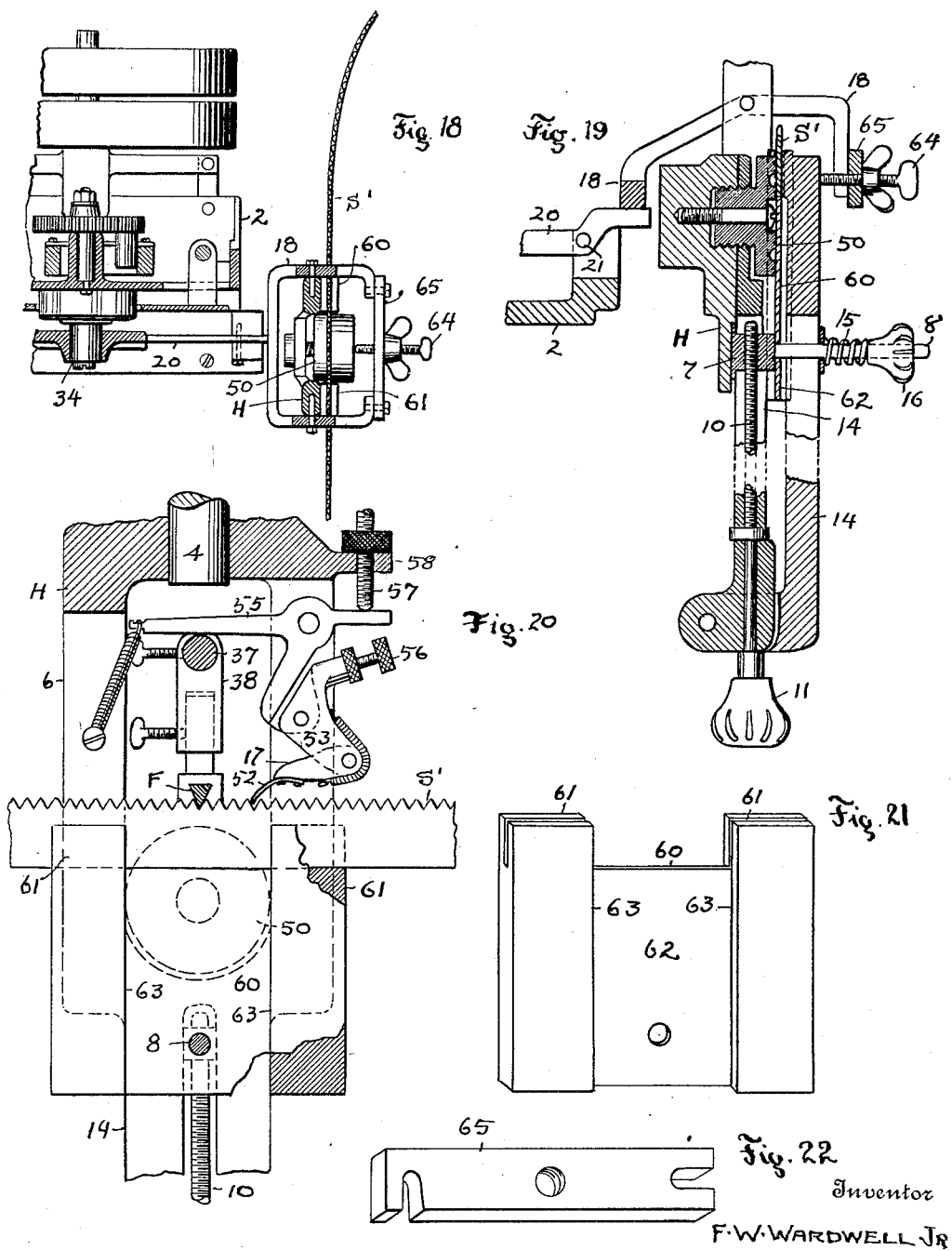

Patented Apr. 12, 1932

1,853,245

UNITED STATES PATENT OFFICE

FRANK WELLINGTON WARDWELL, JR., OF CLEVELAND, OHIO, ASSIGNOR TO THE WARDWELL MANUFACTURING COMPANY, OF CLEVELAND, OHIO, A CORPORATION OF OHIO

SAW FILING MACHINE

Application filed January 11, 1926. Serial No. 80,586.

My invention relates to an improvement in saw filing machines, and more particularly to a machine for filing cross-cut and rip saws automatically. Thus, the machine is designed and arranged to support either a band or circular saw beneath a reciprocating file which is caused to move horizontally in one plane while filing a tooth and to move upwardly at an inclination and then travel reversely in a higher plane to avoid the tooth and permit the saw to be shifted to bring the next tooth into position for filing. The file is suspended to swing in an arc toward the cutting edge of the tooth and to be rotated on its longitudinal axis to facilitate adjustments and different angular settings of the face of the file to the saw teeth. The file holder is also constructed to permit files of different length to be suspended and held adjustably in the way stated. The saw is also held within an oscillatory support which permits the saw to be turned alternately to different angular positions relatively to the line of movement of the file, thereby permitting V-shaped teeth of cross-cut saws to be reversely beveled, or the saw may be held continuouly at right angles to the file, to permit hook-shaped teeth of rip saws to be filed singly and successively at right angles to the plane of the saw. The saw is clamped automatically in a rigid position during the forward or working movement of the file, and released upon the return movement of the file to permit the saw to be shifted automatically the distance of one tooth. An adjustable clamping seat for the saw also permits the saw to be centrally positioned relatively to the oscillatory axis for the saw to promote accurate cross-cut filing operations. The saw may also be raised or lowered in respect to the file to regulate the depth of the cut and to facilitate adjustments and filing operations on different saws.

Figure 1:
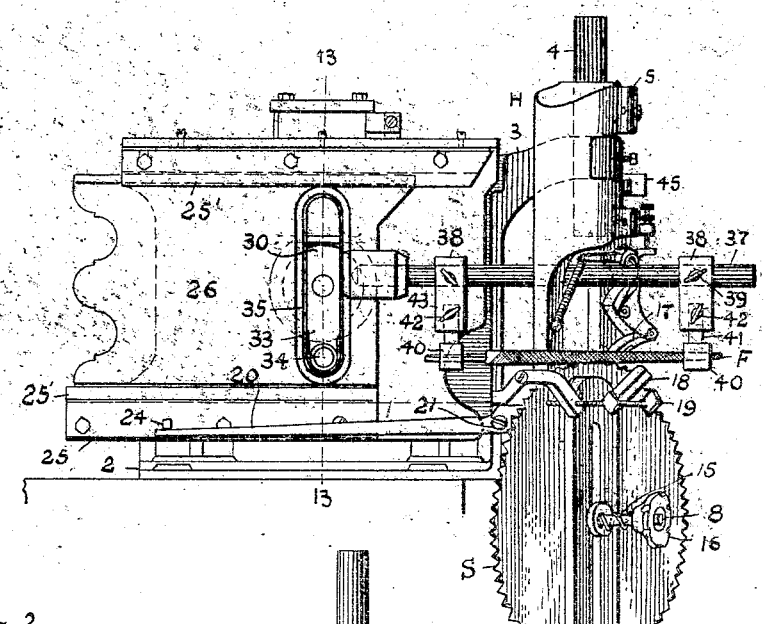
Figure 2:
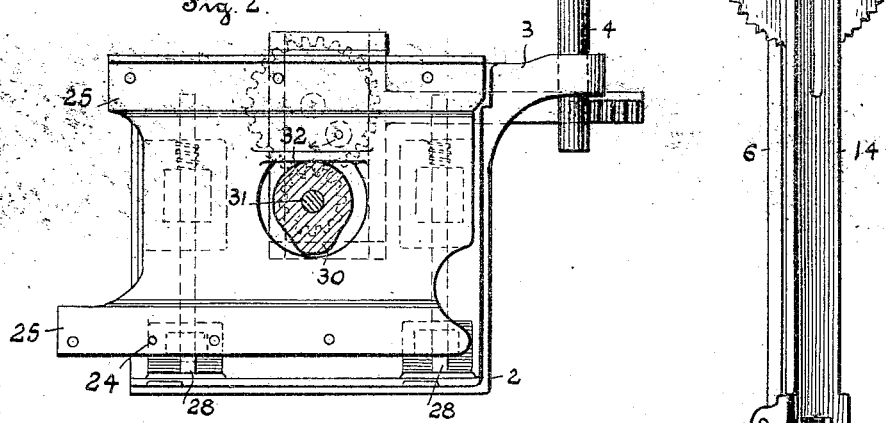
Figure 3:
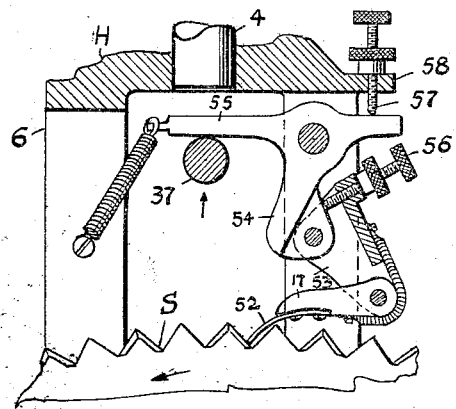
Figure 4:
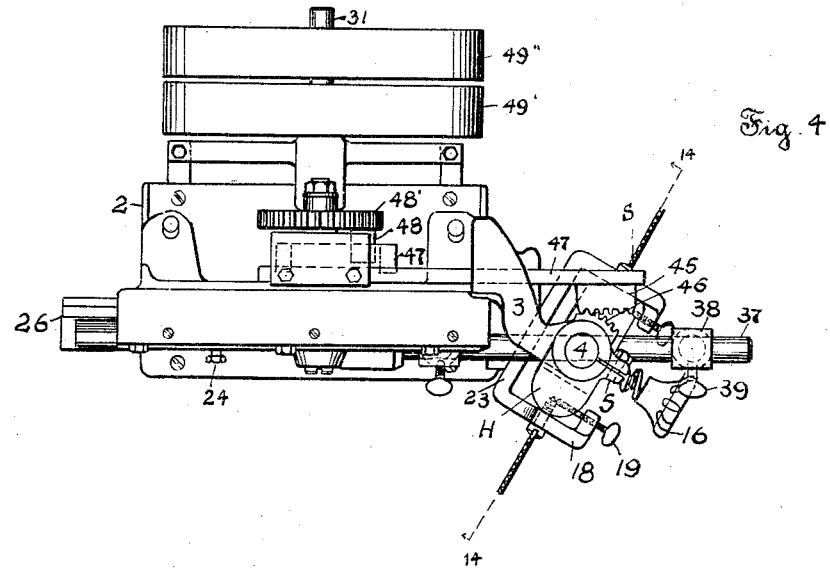
Figure 5:
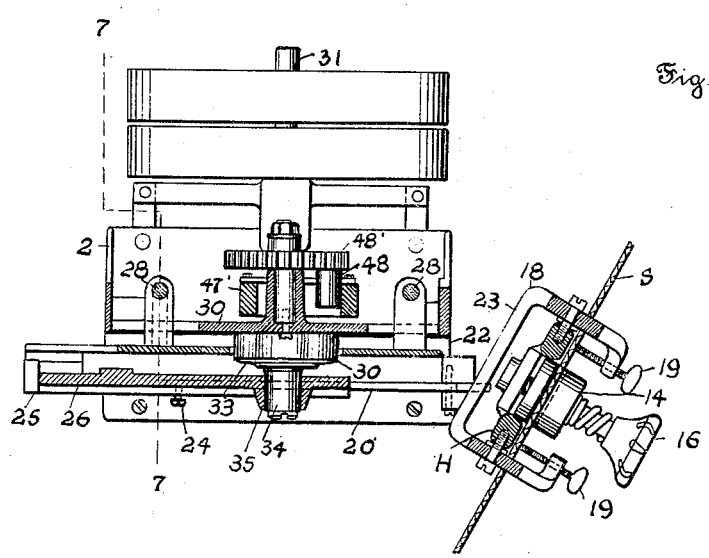
Figure 6:
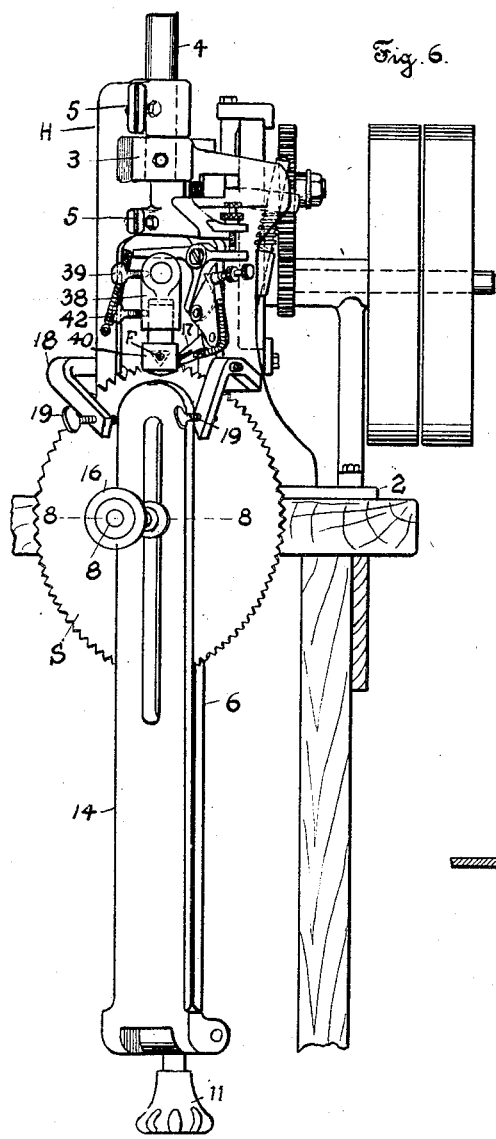
Figure 7:
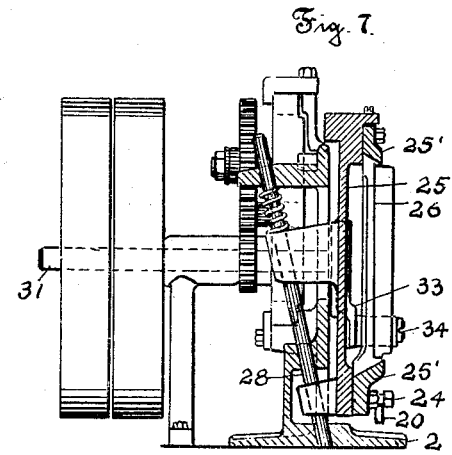
Figure 8:
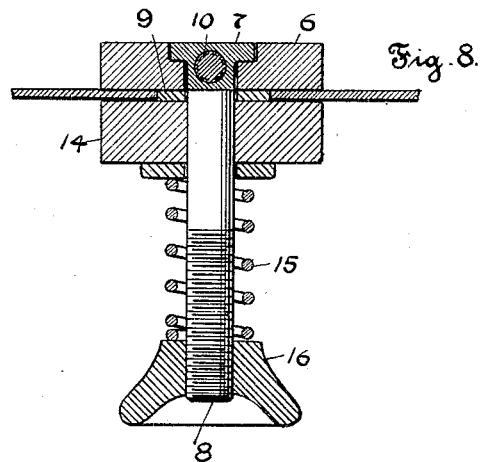
Figure 9:
Figure 10:
Figure 11:
Figure 12:
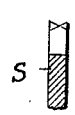

In the accompanying drawings, Fig. 1 is a front view of my improved saw filing machine, and Fig. 2 is a similar view with some of the working parts removed. Fig. 3 is an enlarged view of the feeding mechanism for the saw. Fig. 4 is a top view of the machine, and Fig. 5 is a horizontal section on line 5—5 of Fig. 13. Fig. 6 is an end view of the machine. Fig. 7 is a vertical section on line 7—7 of Fig. 5. Fig. 8 is a horizontal section on line 8—8 of Fig. 6, enlarged. Fig. 9 is a side view of a part of a rip saw. Fig. 10 is an edge view of a cross-cut saw, and Fig. 11 is a side view thereof. Fig. 12 is a sectional view of a cross-cut saw. Fig. 13 is a vertical section of the machine on line 13—13 of Fig. 1. Fig. 14 is a vertical section on line 14—14 of Fig. 4, the saw being shown in dotted lines. Fig. 15 is a sectional view, enlarged, of the clamping holder and centering disk for the saw. Fig. 16 is a face view of said disk, on line 16—16 of Fig. 15. Fig. 17 is a vertical section on line 17—17 of Fig. 14. Fig. 18 is a top view corresponding to Fig. 5, showing an attachment for holding a band saw. Fig. 19 corresponds to Fig. 15, but with the band saw attachment in place. Fig. 20 corresponds in part to Fig. 14, but shows the band saw attachment instead of a circular saw. Figs. 21 and 22 are perspective views of the two attachment members for the band saw.

The machine comprises a stationary main frame 2 which may be mounted upon a table, pedestal, or other suitable support. An integral arm 3 overhangs one end of frame 2 and carries a short vertical shaft 4 adapted to support a swinging or oscillatory hanger H for the saw. As shown this hanger H is suspended from arm 3 and has split bearing portions 5 adapted to be clamped rigidly to shaft 4 if no oscillatory movement is desired. The depending leg 6 of the hanger is channeled and slotted to seat a sliding nut or box 7 having a lateral spindle 8 for a circular saw S. Such saws vary in diameter and have central shaft openings of different diameters, and therefore interchangeable washers or bushings 9 of different diameters may be sleeved on spindle 8 to support such saws rotatably on the spindle. A vertical screw 10 is carried by leg 6 to permit convenient adjustment of the sliding nut for saws of different diameters and to place the toothed edge of the saw either higher or lower in respect to a horizontally movable file F. A hand grip 11 is exposed at the bottom of leg 6 to turn screw 10, and when a given vertical adjustment has been made the saw may be clamped frictionally between leg 6 and a slotted clamping bar 14 which is hinged to the lower end of the leg and held in clamping position by a coiled spring 15 and a hand nut 16 detachably connected with the outer end of spindle 8. Friction clamping permits the saw to be rotated by degrees or tooth by tooth without back-lash, using an oscillating feed pawl 17 to engage the saw teeth. However, the saw is clamped rigidly and immovably while each tooth is being filed by means of a rocking yoke 18 which is pivotally secured to head H and carries a pair of thumb screws 19 to engage the outer face of the saw at equal distances from the vertical axis of hanger H. Yoke 18 is rocked when file F is lowered into engagement with the saw teeth prior to moving the file horizontally across the teeth, and a rocking movement is imparted to yoke 18 by a tilting lever 20 pivoted at 21 upon frame 2 and having a short end 22 adapted to press upwardly against the bow part 23 of yoke 18. The longer end of lever 20 extends beneath a pin 24 which projects laterally from a vertically movable plate 25 having horizontal guides 25′ for a reciprocatory slide bar 26. Lift plate 25 is supported to move in an inclined plane by inclined rods 28 which are fixed at their opposite ends rearwardly of frame 2. Plate 25 is further supported by a rotatable cam 30 on a power transmitting shaft 31 journaled in frame 2, see Fig. 13. Thus an elongated opening in the wall of plate 25 has a straight upper edge 32 which permits the plate to rest upon cam 30, whereby the plate and slide are jointly lifted during an interval of revolution of the cam. A crank arm 33 forms part of cam 30, and a crank pin or roller 34 extends therefrom through a vertical slot 35 in slide bar 26 to reciprocate said bar and the file F. The file is suspended from a round shaft 37 which projects forwardly from the end of slide bar 26 and passes through an opening in hanger H. The holders for the file consist of a pair of suspensory members 38 which are sleeved to turn and slide on round shaft 37 and may be fixed in any desired position by thumbscrews 39. In this way the file may be swung in an arc in respect to the edge of the saw, and files of different length supported from shaft 37. Vertical adjustment of each end of the file is also provided for by auxiliary holding devices 40 having openings to receive the ends of the file and provided with vertical stems 41 adapted to be adjustably secured by set screws 42 within the socket portions 43 of the suspensory members 39. These file holders permit adjustment of the file vertically, horizontally and laterally so that the face of the file may be properly placed to create any desired hook or angle in a tooth.

In filing cross cut saws the saw is turned obliquely to the line of movement of the file to create a beveled cutting edge, and to bevel the opposite edges of each inverted V-shaped tooth, the saw is oscillated or turned from one inclined position to a reversely inclined position relatively to the longitudinal axis of the file. A V-shaped or triangular file may be used to file both edges of the V-shaped interspace simultaneously during a forward movement of the file. When the forward movement of the file stops the file is raised by the lift movement of cam 30 on plate 25 and a reverse or return movement imparted with the file raised apart from the saw teeth. In that interval of operations the turning of the saw to a reverse angle is brought about by a toothed rack 45 which meshes with a segment gear 46 fixed to one of the bearing portions 5 of the hanger H, see Fig. 4. Rack 45 is fixed at the outer end of a horizontal bar 47 which is supported to slide horizontally at the rear of frame 2, and which bar carries at its inner end an open frame 47′ having straight parallel sides against which a roller 48 will strike, first on one side and then on the other, during each complete revolution of a large gear 48′ which meshes with a smaller gear 49 on power shaft 31 carrying a pair of loose and fixed pulleys 49′—49″. Large gears 48′ makes one-half of a revolution while the power shaft and crank arm 33 make a complete revolution, thereby permitting rack 45 to be shifted in one direction while slide bar 26 moves in alternate directions. The movement of rack 45 is short and occurs when the file is lifted free from the saw and the longitudinal movement of the rack sets the saw obliquely before the file is lowered to file a tooth. The file then moves forward and is again lifted free from the saw and the rack is again shifted but in a reverse direction thereby inclining the saw reversely to its former inclined position. The axis of turning movement of the saw is on a vertical line which intersects the bottom edge of the file exactly midway between the sides of the saw so that the successive teeth are reversely beveled in equal degree and to a uniform depth, and the oscillatory movements of the saw are so timed that the reciprocal movements of the file bevel the successive teeth alternately on opposite sides of the saw, that is, the beveled edges on one tooth face one side of the saw and the beveled edges on the next tooth face the other way and so on successively.

Circular cross cut saws vary in thickness dependent upon the size or diameter of the saw, and to promote accurate filing of the teeth on such saws generally I provide adjustable means adapted to permit the saw to be rigidly clamped in the same vertical plane as the oscillatory axis for the saw with the opposite sides of the saw spaced equally distant from the plane of said axis. Thus, in Figs. 15 and 16 I show a flat disk 50 located within a side recess 50' in hanger H directly opposite the clamping end of hinged bar 14. This disk has an axial extension in rotatable screw connection with the recessed part of hanger H so that the exposed face of the disk may be advanced or retired relatively to the vertical axis of the hanger, thereby permitting saws of different thickness to be aligned centrally with the axis as hereinbefore stated. The seating face of the disk may bear radial indicia to indicate the degree of rotation to be given in setting the disk for saws of different thicknesses, and a screw 51' or other suitable device may be used to lock the disk from turning after adjustments have been made.

The feed mechanism for rotating the saw, tooth by tooth, comprises a spring-pressed pawl 17 having a thin steel blade 52 at its tip arranged to engage the teeth successively when the file is raised and on its return stroke. Thus, pawl 17 is pivotally connected with a rock lever 53 carried by a bell crank 54 which is fulcrumed upon hanger H closely adjacent shaft 37 with the horizontal arm 55 of the bell crank extending over the shaft to permit a rock movement to be imparted to the bell crank when the slide and shaft are raised to free the file from the saw. An adjustable set screw 56 carried by lever 53 limits the tilting movement of the lever in respect to the bell crank and permits the pawl to be accurately adjusted to the teeth of the saw. The degree of rock movement imparted to bell crank 54 is regulated by a set screw 57 carried by a lug 58 on hanger H. It serves as an adjustable stop for the bell crank to permit different inclined settings of horizontal arm 55 relatively to shaft 37 which rises a fixed distance before reversing its direction of movement.

The operation of the machine may be gleaned from the foregoing, but briefly reiterating, assume the file is raised apart from the saw teeth and the saw is set obliquely to the file. In this position of the parts lift plate 25 is about to be lowered by cam 30 and crank arm 33 is about to move the slide and file forward. As the cam and crank arm rotate, the lift plate lowers the triangular file into an interspace between the teeth. At the same time the upper part of the saw is pressed tightly against disk 50 by the thumb screws 19 on yoke 18 which is tilted when pin 24 on the descending plate 25 strikes lever 20. The crank arm now moves slide bar 26 forward on a straight line and the file sharpens the teeth. At or near the end of this filing movement the cam raises the lift plate and slide, thereby causing shaft 37 to strike bell crank 54 and operate feed pawl 17 to rotate the saw the distance of one tooth. Uplift of plate 25 also relieves the pressure on lever 20 and yoke 18, and the clamping pressure of the thumb screws 19 on the saw. Now as the slide moves in a reverse direction with the file in an elevated position roller 48 on gear 48' will eventually strike the straight side of rack frame 47' and shift rack 45, thereby swinging hanger H and the saw into a reversely inclined position relatively to the file. The same operations are now repeated on the teeth which have been fed forward, but with reverse beveling effect because the saw is inclined reversely to its former position. But if a circular rip saw is to be filed gear 48' is removed to make rack 45 inoperative, and hanger H is prevented from oscillating and may be clamped upon shaft 4 to hold the saw at right angles to the file.

Referring to Figs. 18 and 22, a straight saw, such as a band saw S' may also be filed in this machine by merely inserting a guide and rest member 60 for the saw within clamping hanger H. The saw, in this case, is supported for sliding movement between the slotted jaws 61—61 of rest member 60, which has a thin perforated web portion 62 adapted to be sleeved over spindle 8, thereby permitting saw S' to be raised and lowered by screw 10 in respect to file F in the same way as a circular saw. The parallel shoulders 63 on rest member 60 may engage the straight side edges of clamping bar 14, thereby holding rest member 60 squarely within clamping holder H. A single clamping screw 64 may also be used with clamping bar 14, which screw may be supported centrally opposite bar 14 by a cross piece 65 screwed or hinged to the legs of yoke 18. A rocking movement of yoke 18 causes screw 64 to apply a clamping pressure to clamping bar 14, thereby clamping the saw against clamping disk 50, see Fig. 19.

What I claim, is:

1. A saw filing machine, comprising a frame, a vertically movable plate upon said frame, a reciprocable member and file holder carried by said plate, an oscillatory hanger for a saw supported upon said frame, a rotatable shaft having a cam for raising said plate, a rack bar for oscillating said hanger, and means geared to said shaft for reciprocating said rack bar.

2. A saw filing machine, comprising a frame, an arm attached to said frame and overhanging one end thereof a vertically movable plate carried by said frame, a slide carried by said plate, a file holder extension for said slide, an oscillatory hanger for a saw pivotally supported by and suspended from said arm attached to said frame, shifting means for oscillating said hanger and pawl mechanism for engaging the saw tooth, said pawl mechanism being adjustable and engageable by said file holder extension and operable upon and by the lift movement of said vertically-movable plate.

3. A saw filing machine, comprising a vertically movable plate and a slide thereon carrying a file holder, an oscillatory hanger for a saw, a pivotally arranged and yoke shaped clamping device for the saw carried by said hanger, and a tilting lever operably connected to said vertically movable plate and operating to periodically actuate said clamping device.

4. A saw filing machine, comprising a vertically movable plate carrying a reciprocable slide and file holder, an oscillatory support for a saw, a tilting yoke upon said oscillatory support carrying a clamping screw for the saw, and a tilting lever adapted to engage said yoke and operable by the vertical movements of said plate.

5. A saw filing machine, comprising a horizontally reciprocable file holder, an oscillatory hanger having a vertically-adjustable support for a saw, a hinged clamping bar yieldingly clamped to said oscillatory hanger and adjustable means independent of said clamping bar for rigid clamping of said saw in said hanger during filing operations.

6. A saw filing machine, comprising a reciprocable file holder, a hanger having a vertical adjusting screw carrying a supporting member for a saw, a clamping bar for yieldingly clamping the saw, said bar being hinged to said hanger and separate means directly acting upon said saw for rigidly clamping said saw during filing operations.

7. A saw filing machine, comprising an oscillatory hanger having a vertical screw carried thereby and provided with a slotted clamping bar hinged to said hanger, a supporting member for a saw slidably mounted upon said hanger and connected with said screw having a screw-threaded stem extending through said slotted bar, a spring and nut sleeved upon said stem and engaging said bar for yieldingly clamping said bar to said hanger and separate pivotedly supported clamping means for rigidly clamping a saw against said hanger during filing operations.

8. A saw sharpening machine, including a frame, sharpening means, a support for a saw pivotally connected with said frame, and adjusting means for centering the saw with its axis intersecting the axis of said pivot and so that the central plane of the saw is in the same plane as the axis of said pivot.

9. A saw sharpening machine, including a frame, reciprocating sharpening means, an oscillatory support for a saw pivotally connected with said frame for different angular positions of said frame and said support means to intermittently oscillate said support and adjusting means for centering the central plane of the saw in a plane through the axis of said pivot so that the central axis of the saw, intersects with the axis of said pivot.

10. A saw filing machine, comprising a frame having at its top end an arm overhanging one end of said frame; a vertical slide upon said frame; a horizontal slide carried by said first slide; a file holder mounted upon said horizontal slide; an oscillatory hanger for a saw pivotally suspended from said arm of said frame; co-operating means for reciprocating said vertical and horizontal slides, including cam and crank mechanisms, and means for oscillating said hanger intermittently.

11. A saw filing machine, comprising a reciprocable file holder and an oscillatory support for a saw including a frame carrying a supporting member for a saw, a separate backing member for a saw screw-connected with said frame and a bar hinged to said frame, said bar having a clamping jaw member opposite said separate backing member.

12. A saw filing machine, comprising a stationary frame having an arm overhanging one end of the frame, a plate vertically movable in guides attached to said frame, a reciprocable member and file holder slidably confined in guides of said plate, an oscillatory hanger pivotally supported by and extending downwardly from said arm of said frame having an elongated opening in its upper part and a downwardly extending leg portion, a support for a saw adjustably secured to said leg portion of said hanger, a clamping bar hinged to the lower end of said leg portion of said oscillatory hanger, driving means for said reciprocable member and means associated with said driving means for intermittent oscillatory movement of said hanger.

13. A saw filing machine, comprising a stationary frame, a plate vertically movable upon said frame, a reciprocable member having a file holder supported thereby, an oscillatory hanger pivotally supported on said frame and adjustable means on said hanger adapted to support a saw beneath a file secured within said holder, means for reciprocating said reciprocable member, and means positively controlled by said last named means for oscillating said hanger intermittently with periods of rest during filing movements of said reciprocable member.

14. In a saw-filing machine, a reciprocable and vertically movable file holder, an oscillatory saw support comprising a pair of jaws hinged together at their lower ends and provided with vertical slots, a saw-carrying rod mounted in said slots, and means mounted on said rod for causing the jaws to clamp a saw mounted on the rod.

In testimony whereof I affix my signature.

FRANK WELLINGTON WARDWELL, Jr.